Nov. 14, 1961  F. AKUTOWICZ  3,008,727
AUTOMOBILE STEERING LINKAGE
Filed April 22, 1960

INVENTOR.
FRANK AKUTOWICZ
BY

United States Patent Office 3,008,727
Patented Nov. 14, 1961

3,008,727
AUTOMOBILE STEERING LINKAGE
Frank Akutowicz, 2007 Harvey Road, Wilmington, Del.
Filed Apr. 22, 1960, Ser. No. 23,976
3 Claims. (Cl. 280—95)

This invention relates to an automobile steering linkage useful as a means for steering a car equipped with the suspension linkage described in Heyermans 2,131,661. Such a suspension linkage guides the running wheel independently of other wheels. Bump and rebound motion occurs in a straight line with respect to the sprung mass, and without loss of caster, camber or toe. Parts tending to move with the body and the wheel respectively are said to be sprung and unsprung. The present invention maintains rigidly the directional orientation of the steered wheels, and at the same time permits easy flexure to accommodate bump and rebound motion of the steered wheels. In addition, the spontaneous geometrical change in toe occurring as the steered wheel moves in bump and rebound motion is exceedingly small, amounting at most to a few minutes of arc and occurs only while cornering. The Ackermann condition, relating the orientation of two steered wheels when cornering, is fulfilled to within an error less than the normal errors of assembly and alignment.

In the preferred embodiment the linkage receives steering motions through a pinion engaging a rack on a tie rod slidably mounted transversely on the sprung mass between the two steered wheels. The tie-rod is connected at each end through ball joints to articulated steering levers which are pivotally attached on their unsprung ends to the steering knuckles. The axis of articulation of the intermediate hinged joint is parallel to the axis of pivotal attachment to the steering knuckle and both axes are perpendicular to the direction of bump and rebound motion of the running wheel when the wheel is directed straight ahead. In bump and rebound motion the articulated steering lever functions in a vertical plane as a two-bar linkage connecting the tie rod to the steering knuckle. In steering motion the articulated steering lever functions horizontally as a one bar link cantilevered from the steering knuckle because the steering lever is stiff in the direction of its axis of articulation. The steering lever must be torsionally rigid and lightweight, both properties attainable, for example, by fabricating the links out of seamless tubing with closed ends, and by using hollow pins for the pivotal connections.

Figure 1:
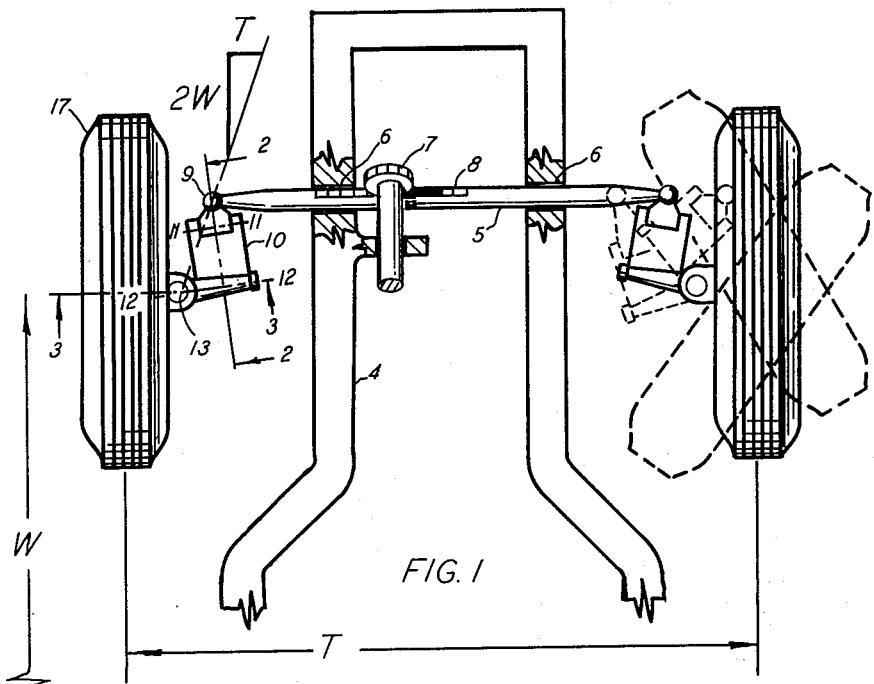
Figure 2:
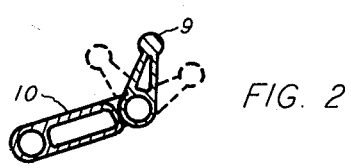
Figure 3:
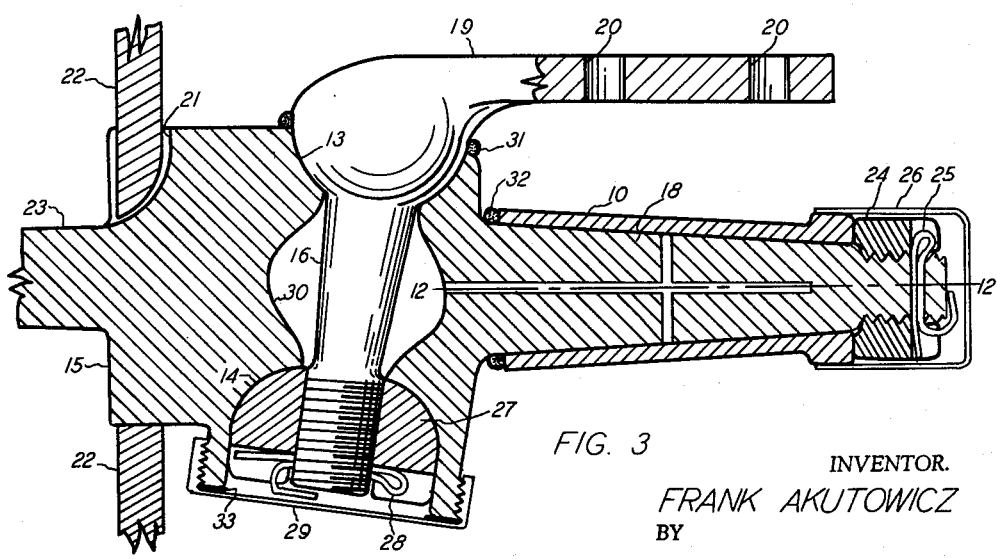

In the drawing, FIGURE 1 is a plan view of the steering linkage assembly showing the arrangement of frame, wheels, steering levers and tie-rod. FIGURE 2 is a central vertical section of the steering lever showing the mode of articulation. FIGURE 3 is a section of the wheel support showing the steering knuckle, king pin, wheel spindle, brake backing plate, and cantilevered pivot pin for axial pivotal interconnection with the steering lever.

Frame 4 supports tie-rod 5 slidably in bushings 6. Pinion 7 engaging rack 8 on tie-rod 5 communicates steering motions to 5, that is, sliding motion to right or left. Ball joint 9 provides spherical pivotal interconnection between rod 5 and articulated steering lever 10. Axis of articulation 11—11 and axis of pivotal connection 12—12 are mutually parallel and both are perpendicular to the direction of bump and rebound motion when the wheels are in the straight ahead position. The steering knuckle surface at 13 and 14 in wheel support 15 carries king pin 16 about which wheel 17 swivels in steering motion, as shown dotted in FIGURE 1. 18 is the pivot pin with pivotal axis 12—12 for attachment of the unsprung end of steering lever 10. The changing distance between ball joint 9 and pivot pin 18 is taken up by the articulation in lever 10 about axis 11—11, as shown dotted in FIGURE 2. This same articulation occurs during bump and rebound motion, and does not change the angular orientation of ball 9 with respect to steering knuckle 13 as seen in plan view because knuckle 13 moves in a straight vertical line with respect to frame 4. The angular orientation of ball 9 with respect to steering knuckle 13 is shown on the drawing as the angle whose tangent is $T/2W$ where T is the tread of the vehicle and W the wheel base. This is the Ackermann condition relating the angular orientation of the steering levers to the longitudinal direction of the car. The angular orientation is seen in the longitudinal horizontal plane (the plane of the drawing) and is defined by the longitudinal vertical plane and the plane through the kingpin axis and the center of proximal ball 9.

The inclination of kingpin 16, as seen in FIGURE 3, necessarily implies that axis 12—12 will not be perpendicular to the direction of bump and rebound motion whenever the linkage is in a cornering configuration, which fact implies that a slight change in toe occurs during bump and rebound when the vehicle is cornering. This change in toe is very small, however, and amounts to less than the normal error in assembly and alignment of parts.

Kingpin 16 is cantilevered from plate 19 which is held by fasteners through holes 20 to the suspension linkage not shown. Kingpin 16 and plate 19 are proportioned to withstand the braking torque appearing in wheel support 15 through splines 21 from brake backing plate 22. 23 is the spindle for wheel 17. Pin 18 is shown tapered so that retaining nut 24 can be adjusted to take up any wear between parts 10 and 18. Nut 24 is itself retained by cotter pin 25 and covered by press-cap 26. Nut 27, forming the lower bearing of kingpin 16, is threaded on 16 to take up any wear in the steering knuckle at 13 and 14. Nut 27 is retained by cotter pin 28 and covered by threaded cap 29. The cavity 30 in wheel support 15 can be filled with fluid lubricant to lubricate the steering knuckle at 13 and 14 and pivot pin 18. Sealing rings 31, 32 and 33 reduce the seepage of such lubricant.

I claim:

1. In an automobile steering linkage for directional control of wheels independently suspended from a sprung mass the combination comprising an unsprung steerable wheel support having an axle portion, an articulated steering lever, a tie-rod, means for slidably mounting said tie-rod on said sprung mass, means adapted to communicate steering motion to said tie-rod, axial pivotal interconnecting means between said wheel support and said steering lever, spherical pivotal interconnecting means between said steering lever and said tie rod, axial pivotal articulating means in said steering lever being positioned intermediately of said wheel support interconnection and said tie rod interconnection, the axis of said wheel support interconnection being substantially perpendicular to the direction of bump and rebound motion of said wheel support with respect to said sprung mass, the axis of said pivotal articulating means being parallel to said axis of the wheel support interconnection.

2. Two steering linkages as described in claim 1 further provided in each that said axis of the wheel support interconnection is substantially aligned with the axis of the wheel support axle, and said two linkages are tied together by said tie rod.

3. A linkage as described in claim 2 together with an automobile having tread T and wheelbase W and a kingpin axis in said steerable wheel support wherein the plane defined by said kingpin axis and the center of said spherical pivotal interconnecting means on the proximal end of said tie-rod intersects the horizontal longitudinal plane in a line making an angle whose tangent is T/2W with the line of intersection of said horizontal longitudinal plane and the vertical longitudinal plane.

References Cited in the file of this patent

UNITED STATES PATENTS

| | | |
|---|---|---|
| 1,810,609 | Johnson | June 16, 1931 |
| 2,123,335 | Herreshoff | July 12, 1938 |